July 14, 1936.  R. H. LEWIS ET AL  2,047,376
WATT-HOUR DEMAND METER
Filed Nov. 29, 1935
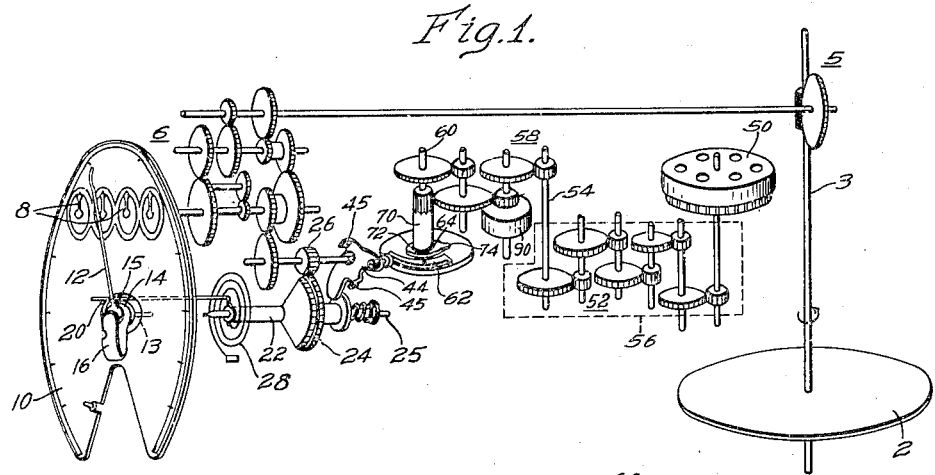
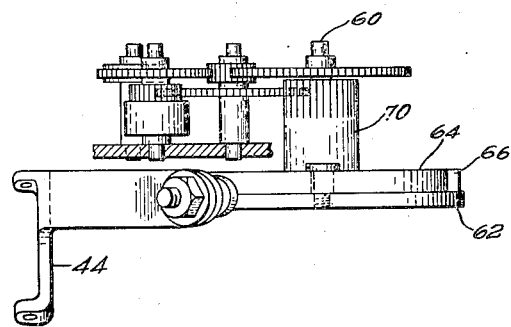
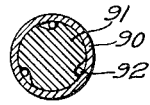
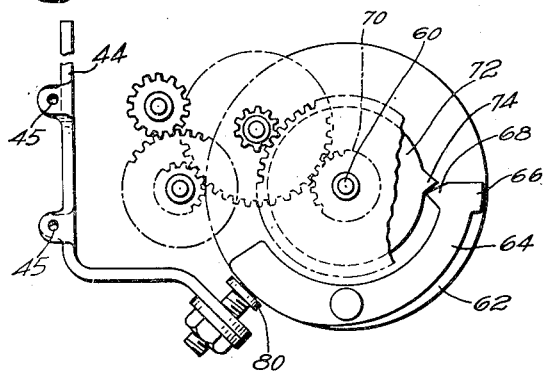
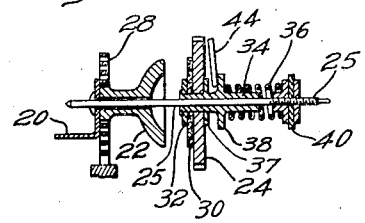
WITNESSES:
INVENTORS
Robert H. Lewis and
George W. Rosenberger.
BY
ATTORNEY Patented July 14, 1936

2,047,376

UNITED STATES PATENT OFFICE 2,047,376

WATT-HOUR DEMAND METER

Robert H. Lewis, North Arlington, and George W. Rosenberger, Orange, N. J., assignors to Westinghouse Electric & Manufacturing Company, East Pittsburgh, Pa., a corporation of Pennsylvania Application November 29, 1935, Serial No. 52,096

9 Claims. (Cl. 171—34)

The present invention relates to watthour demand meters and more particularly to the type of meter which measures the maximum demand or consumption of electrical energy during periodically recurring intervals of time, commonly known as the block-interval type of demand meter.

In the type of meter contemplated, it is usual for the watthour meter element to drive an actuating lever or dog which in turn pushes an indicating pointer over a dial in accordance with the demand of energy as measured by the meter. The driving lever or dog is periodically returned to its zero position at 15 or 30 minute intervals, or of any other desired duration, by means of a timing mechanism which interrupts the driving connection between the dog and meter, and the indicating pointer is maintained in its furthest advanced position by friction.

It is an object of the present invention to provide an improved device for interrupting the driving connection between the watthour meter and actuating dog and an improved timing mechanism for controlling the operation of such disconnecting means.

It is a further object of the invention to provide a demand register for a watthour meter of improved construction such that friction losses are minimized and the time required to set the reset dog is reduced to a minimum.

Further objects of the invention will be apparent from the following specification and attached drawing in which:

Figure 1 is a diagrammatic illustration of the mechanism constructed in accordance with the present invention, Fig. 2 is a view in elevation of a portion of the improved timing mechanism utilized in the present invention, Fig. 3 is a plan view, with parts broken away, of the mechanism shown in Fig. 2, Fig. 4 is a view in section of a clutch utilized in the present invention, and Fig. 5 is a view in section of a non-reversible driving connection utilized in the structure shown in Fig. 1.

Referring more specifically to Fig. 1, a watthour meter is indicated by rotatable disc 2 which drives a shaft 3 connected through a worm gear and worm wheel 5 to a watthour meter integrating gear train indicated generally as 6. The gear train as shown is not complete but is of a usual type to operate the integrating pointers 8 in a well known manner.

The face of the demand meter register 10 is provided with a dial around the edge thereof for cooperation with a demand point 12 in the usual manner. The pointer 12 is pivoted at the center of the dial upon a shaft 13 journaled in a bracket (not shown) secured to the rear of the dial plate. The indicator 12 is frictionally held against a non-rotatable element 14 with a disc 15 of resilient material disposed therebetween and a spring clip 16, also secured to the dial plate 10, to bias the pointer against the resilient disc. As a result, the demand pointer when advanced as hereinafter described, is maintained frictionally in its furthest advanced position to give a reading of the highest energy demand during the metering period.

The indicator 12 is advanced in accordance with the watthour consumption by a dog 20 secured to a sleeve 22 which is driven by a gear 24 operated from a pinion 26 which is in turn driven from the integrating register gear train.

Referring to Fig. 4, the sleeve 22 and gear 24 constitute two elements of a friction clutch, the showing in Fig. 4 indicating the position of the parts when the clutch elements are disengaged as hereinafter described.

The sleeve 22 has secured to the outer end thereof the dog 20, and is free to rotate upon a shaft 25. A coil spring 28 having one end secured to the sleeve 22 and the other to a stationary part of the meter, preferably the rear face of the dial plate 10, is effective, when the elements are in the position shown in Fig. 4, to rotate the sleeve to its zero position with the dog 20 against a notch (Fig. 1) in the spring clip 16 on the front of the dial plate 10. In addition the spring 28 is effective to prevent the sleeve 22 from following the other half of the clutch when the clutch is disengaged.

The inner end of the sleeve 22 is enlarged and recessed, as indicated, to cooperate with a resilient pad 30 secured to the face of the gear 24 by the enlarged head portion 32 of a sleeve 34 which is also rotatable upon the shaft 26 and slidable therealong. When the clutch elements are in engagement the face of the enlarged end on sleeve 22 is in engagement with the resilient pad 30, and the enlarged head 32 of the sleeve 34 is disposed within the recess of such head portion.

The sleeve 34 is provided with two flanges 37 and 38; the gear 24 and resilient pad 30 being maintained tight against the outer face of flange 31 by the head portion 32 which is pressed upon the end of the sleeve 34.

The clutch elements are biased toward engaging position by means of a spring 36 abutting the outer face of flange 38 and an adjustable stop 40 threaded on the free end of shaft 26. This biasing force is overcome, when it is desired to separate the clutch elements by a lever 44 disposed between the flanges 37 and 38 of sleeve 34.

In order to separate the clutch elements at periodic intervals, the invention contemplates an improved timing mechanism including a small synchronous motor 50 of any well known type which will maintain synchronous or sub-synchronous speed on an alternating current circuit. The motor 50 in the present embodiment operates a train of gears 52 to reduce the motor speed to one revolution per minute at shaft 54. As indicated by dotted line 56 in Fig. 1, the train of gears for accomplishing this purpose is intended to be enclosed in an oil-tight casing having a quantity of liquid lubricant therein which is fed to the bearing surfaces by capillary attraction.

The shaft 54 operates through reducing gearing 58 to drive shaft 60 at a desired low speed. In the present embodiment, it is contemplated that the speed of shaft 60 shall be one revolution for each demand interval, for example, one revolution in 10, 30, or 60 minutes, depending upon the interval desired in the locality where the meter is to be used.

A disc 62 is secured to the lower end of the shaft 60 and has pivoted thereon a lever 64, having a head portion 66 which is enlarged as shown more clearly in Figs. 2 and 3, and an inwardly projecting cam portion 68 for a purpose described hereinafter.

A sleeve 70 is freely rotatable upon the shaft 60 and is driven from one of the gears of the reducing train 58 as shown. This sleeve is intended to operate at a substantially higher speed than the shaft 60. For example, in one embodiment of the invention the sleeve 70 operates twelve times as fast as the shaft 60. The lower end of the sleeve 70 carries a disc 72 having a cam surface 74 in a position to engage the cam surface 68 on the pivoted lever 64 upon relative rotation of the discs 72 and 62. In view of the difference in relative speeds of the two discs and with the embodiment above mentioned, the cam portions 68 and 74 will engage twelve times during each revolution of the disc 62, that is, twelve times during each demand interval. Upon such engagement the pivoted lever 64 is thrown outwardly, projecting the head 66 beyond the peripheral edge of the disc 62.

The lever 44 which is pivoted at 45 to swing away from the disc 62 (Figs. 2 and 3) is provided with a head portion 80 positioned to be engaged by the head 66 of the lever 64 when the cam portions 68 and 74 engage at this point once during each revolution of the disc 62. It will be appreciated that although the cam portions engage many times during each revolution, only once will they engage at the point where the head 80 is positioned. At other times, although the head 66 of the lever will be thrown outwardly, the cam portion 74 quickly engages the tail of the lever 64 to bring the cam portion 68 back into the path of the cam portion 74.

It should be appreciated that if the actuation of lever 44 was accomplished by means of a cam or enlargement on the disc 62, the time consumed to actuate it and return it to the position shown in Fig. 3 would be appreciable because of the slow speed of the disc 62. By means of the arrangement shown and described, the cam portions 68 and 74 engage and pass each other twelve times more rapidly than if the disc 62 were used alone.

This is an important aspect of the present invention because the time during which the head portion 80 is moved outwardly and returned represents the time during which the clutch elements 22 and 24 are disengaged, and accordingly the time during which the watthour meter cannot move forward the dog 20. Operating efficiency therefore demands that this time be made as short as possible.

When the head 80 of the lever 44 is moved outwardly the tail of the lever engages the flange 38 on the clutch mechanism to overcome the bias of spring 36 and permit the spring 28 with its dog 20 to return to zero position.

The reducing gearing 58 also includes a non-reversible clutch 90 to prevent reverse movement of the timing mechanism. As indicated in Fig. 5, this clutch may comprise a shell secured to the gear immediately above it, as shown in Fig. 1, and free to rotate upon the shaft. Within the shell and secured to the shaft is a member 91 having peripheral recesses for receiving small steel rods 92 to constitute a one-way driving connection in a usual manner.

It should be apparent that by means of the construction shown and described we have devised a simple and improved construction in which the time of resetting the dog 20 is reduced to a minimum and in which the operation of the clutch for controlling the drive between the dog 20 and the watthour meter mechanism is positive in operation and may be quickly released by the timing mechanism shown in a minimum time.

Quite obviously the structure shown is capable of considerable modification, and it is requested that no limitations be placed upon the invention except as imposed by the prior art and the appended claims.

We claim as our invention:

1. In a demand register having means for giving a reading of the demand of a quantity measured by a meter, and a member to be driven by such meter to control said means; means for rendering said member intermittently effective to control said means including a timing mechanism, a cam driven thereby at a predetermined speed, a second cam driven by said mechanism at a different rate of speed and having a cam surface in a position to engage the cam surface of the first cam a plurality of times during one revolution thereof, and a member disposed in the path of said second cam at one of the points where the two cam surfaces engage.

2. In a watthour demand meter including an indicating means so mounted that it will remain in its furthest advanced position, a member for advancing said means in accordance with the operation of a watthour meter element, and a device for breaking the driving connection between said member and meter to return the member to its zero position; means for actuating said device at timed intervals including a timing mechanism, a cam wheel rotated thereby at a certain speed having a cam surface of limited area, a second wheel driven by said mechanism at a lower speed, a member pivoted to said wheel in a position to have one end thereof in the path of movement of said cam surface to be periodically moved thereby beyond the periphery of said wheel, and a lever having one end thereof adjacent to said periphery at a point where said cam surface engages the end of said pivoted member.

3. In a watthour demand meter including an indicating means so mounted that it will remain in its furthest advanced position, a member for advancing said means in accordance with the operation of a watthour meter element, and a device for breaking the driving connection between said member and meter to return the member to its zero position; means for actuating said device at timed intervals including a timing mechanism, a cam wheel rotated thereby at a certain speed having a cam surface of limited area, a second wheel driven by said mechanism at a lower speed, a member pivoted to said wheel in a position to have one end thereof in the path of movement of said cam surface to be periodically moved thereby beyond the periphery of said wheel, said cam wheel and second wheel being mounted coaxially, and a lever having one end thereof adjacent to said periphery at a point where said cam surface engages the end of said pivoted member to actuate the latter into engagement with the end of said lever.

4. In a watthour demand meter including an indicating pointer so mounted that it will remain in its furthest advanced position, a member for advancing said pointer in accordance with the operation of a watthour meter element, and a device for breaking the driving connection between said member and meter to return the member to its zero position; means for actuating said device at timed intervals including a timing mechanism, a cam wheel rotated thereby at a certain speed having a cam surface of limited area, a second wheel driven by said mechanism at a lower speed, a member pivoted to said wheel in a position to have one end thereof in the path of movement of said cam surface to be periodically moved thereby beyond the periphery of said wheel, said cam wheel and second wheel being mounted coaxially, and a lever having one end thereof adjacent to said periphery at a point where said cam surface engages the end of said pivoted member to actuate the latter into engagement with the end of said lever, the other end of said lever being in operative engagement with said device for breaking said driving connection.

5. In a watthour demand meter including means for giving a reading of maximum demand, a member for advancing said means in accordance with the operation of a watthour meter element, and a device for breaking the driving connection between said member and meter to return the member to its zero position; means for actuating said device at timed intervals including a rotatable disc having a projecting portion, a second rotatable disc having a member pivoted thereon in the path of movement of said projecting portion to be moved thereby, a pivoted lever having one end disposed to be engaged by said pivoted member when the latter is engaged by said projecting portion, the other end of said lever being in operative engagement with said device for breaking said driving connection, and timing mechanism for driving said discs at constant but different speeds.

6. In a watthour demand meter including an indicating pointer so mounted that it will remain in its furthest advanced position, a member for advancing said pointer in accordance with the operation of a watthour meter element, and a device for breaking the driving connection between said member and meter to return the member to its zero position; means for actuating said device at timed intervals including a rotatable disc having a projecting portion, a second rotatable disc having a member pivoted thereon in the path of movement of said projecting portion to be moved thereby, said discs being mounted coaxially with said projecting portion substantially in the plane of movement of said pivoted member, a pivoted lever having one end disposed to be engaged by said pivoted member when the latter is engaged by said projecting portion, the other end of said lever being in operative engagement with said device for breaking said driving connection, and timing mechanism for driving said discs at constant but different speeds.

7. In a watthour demand meter including an indicating pointer so mounted that it will remain in its furthest advanced position, a member for advancing said pointer in accordance with the operation of a watthour meter element, and a device for breaking the driving connection between said member and meter to return the member to its zero position; means for actuating said device at timed intervals including a rotatable disc having a projecting portion, a second rotatable disc having a member pivoted thereon in the path of movement of said projecting portion to be moved thereby, said first named disc being rotatably mounted on the shaft of said second disc, a pivoted lever having one end disposed to be engaged by said pivoted member when the latter is engaged by said projecting portion, the other end of said lever being in operative engagement with said device for breaking said driving connection, and timing mechanism for driving said discs at constant but different speeds.

8. In a demand meter including means for giving a reading of maximum demand and a member for advancing said means in accordance with the operation of a meter; a clutch for controlling the connection between said member and meter comprising a shaft, a sleeve loosely mounted on said shaft upon which said member is mounted, resilient means secured to said sleeve and to a support, an enlarged end on one end of said sleeve constituting one face of a friction clutch, a gear on said shaft having a resilient pad secured thereto constituting the other clutch face and adapted to be driven by said meter, means for biasing said gear and pad into engagement with said enlarged end of the sleeve, and means for overcoming said biasing means at periodic intervals to separate the clutch elements, said resilient means, being effective, when said clutch elements are separated to rotate said sleeve to its zero position and to restrain the sleeve from following the gear and pad along the shaft.

9. In a demand meter including means for giving a reading indicative of demand and a member for controlling said means in accordance with the operation of a meter; a clutch for controlling the connection between said member and meter comprising a shaft, a sleeve loosely mounted on said shaft and resilient means connecting the sleeve and shaft, means driven by said meter and means for biasing it into driving engagement with said sleeve, and means for periodically overcoming said biasing means to break said driving engagement, said resilient means being effective when said biasing means is overcome to rotate said sleeve to a predetermined position and to restrain the sleeve against longitudinal movement on the shaft.

ROBERT H. LEWIS.
GEORGE W. ROSENBERGER.